United States Patent [19]

Godare

[11] 4,263,025
[45] Apr. 21, 1981

[54] BAFFLE PLATE FOR CYCLONE STEAM SEPARATOR

[75] Inventor: William L. Godare, Shreveport, La.

[73] Assignee: W-K-M Wellhead Systems, Inc., Shreveport, La.

[21] Appl. No.: 31,722

[22] Filed: Apr. 20, 1979

[51] Int. Cl.³ .............................................. B01D 19/00
[52] U.S. Cl. ........................................ 55/185; 55/191; 55/204
[58] Field of Search ...................... 55/41, 52, 184, 185, 55/191, 192, 204, 394, 396, 398, 459 R

[56] References Cited

U.S. PATENT DOCUMENTS

| | | | |
|---|---|---|---|
| 1,770,774 | 7/1930 | Hackett | 55/204 |
| 1,897,332 | 2/1933 | Raymond | 55/204 |
| 2,981,369 | 4/1961 | Yellott et al. | 55/398 |

*Primary Examiner*—Ernest G. Therkorn
*Attorney, Agent, or Firm*—Eugene N. Riddle; Stephen T. Belsheim

[57] ABSTRACT

A bottom outlet cyclone steam separator having a baffle plate (18) which separates the separator vessel (12) into a steam chamber at the top and a water chamber at the bottom. An inlet (24) to the vessel admits an incoming mixture of steam and water in a swirling flow pattern to provide centrifugal action which separates the water from the steam. A plurality of open ended scoops (52) are spaced around the periphery of the baffle plate (18) to direct water into the water chamber through openings (50) of the baffle plate which underlie the scoops.

5 Claims, 3 Drawing Figures

BAFFLE PLATE FOR CYCLONE STEAM SEPARATOR

BACKGROUND OF THE INVENTION

This invention relates to the field of steam separators and is directed more particularly to a cyclone steam separator having an improved baffle plate between the steam and water chambers in the separator vessel.

In cyclone type steam separators, the water droplets of an incoming steam-water mixture impinge against the inside surface of the separator vessel due to the centrifugal forces developed by the swirling motion of the fluid as it enters the vessel. The water then drains down the vessel wall into a water collection chamber at the bottom of the vessel. The less dense steam is not affected by the centrifugal action and rises into a steam chamber located at the top of the vessel. A steam outlet conduit directs the steam out of the separator vessel for use in generating power or for other purposes. In a bottom outlet separator, the steam outlet conduit extends vertically within the vessel to direct the steam out at the bottom. In a top outlet separator, the steam rises and exits directly from the top of the vessel.

In the past, a baffle plate has been provided in the separator vessel to separate the steam chamber from the water chamber, thus isolating the two zones. An annular opening is usually formed in the center of the baffle around the steam outlet conduit to accommodate the passage of water downwardly through the baffle and into the water chamber. However, the centrifugal action of the steam separator causes the water to collect for the most part on or near the vessel wall a considerable distance outwardly of the annular opening. Consequently, the water does not always pass into the water collection chamber fast enough and in sufficient quantities to properly isolate the water and steam in the separator vessel. The swirling fluid above the baffle tends to sweep up any water standing on the baffle so that effective separation of the steam from the water is not achieved in this situation.

One approach that has been taken in attempting to overcome this problem has been to employ a special outer loop element for the purpose of directing water from above baffle plate to the water chamber located below it. The loop element is in the form of a C-shaped conduit which connects at one end with the vessel wall in the area immediately above the baffle and at the opposite end with the vessel wall at a location below the baffle. Although loop devices of this nature function in a generally acceptable manner with respect to directing water past the baffle plate, they have not been entirely satisfactory in other respects. Most notably, the need for the loop element adds to the cost and complexity of the steam separator and to the assembly difficulties. Moreover, the loop receives water at only a single location on the circumference of the vessel, and water at remote locations is delayed entering the loop for passage into the water collection chamber. The loop also complicates the structure and maintenance difficulties in that it is mounted to the outside wall of the vessel at an exposed location. Another problem is that corrosion and other damage to the loop element can detract from its ability to function properly and can thus have a significant adverse effect on the performance of the steam separator.

SUMMARY OF THE INVENTION

The primary object of the present invention is to provide in a cyclone type steam separator, a baffle plate between the steam and water zones which allows water to pass downwardly into the water chamber without the complications associated with the loop element that has been used in the past for this purpose. Another object of the invention is to provide a baffle plate of the character described which simplifies the structure of the steam separator and reduces the costs and assembly difficulties, as well as the distance of travel of the water flowing to the water collection chamber. Still another object of the invention is to provide a baffle plate of the character described which is highly efficient and which is capable of handling the large capacities.

In accordance with the invention, the baffle plate of a cyclone steam separator has a series of openings spaced around its periphery and an upwardly projecting scoop adjacent each opening to direct water thereto. The scoops are located next to the wall of the separator vessel and are open on the end facing the swirling fluid in the vessel and also on the inside. Water on the baffle tends to enter the scoops due to the centrifugal action of the swirling fluid, and the water is thus directed downwardly through the openings into the water collection chamber located below the baffle plate.

DETAILED DESCRIPTION OF THE INVENTION

In the accompanying drawings which form part of the specification and are to be read in conjunction therewith:

Figure 1:
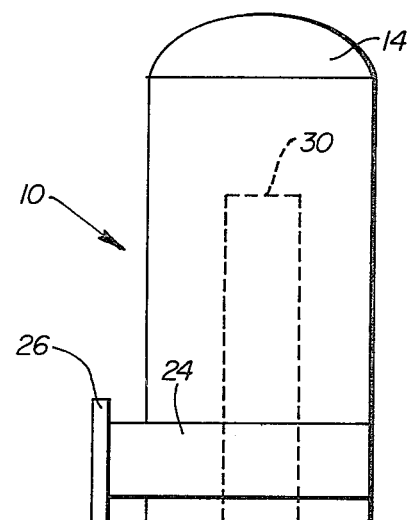
FIG. 1 is an elevational view of a bottom outlet cyclone steam separator which is equipped with a baffle plate constructed in accordance with a preferred embodiment of the present invention.

With initial reference to FIG. 1, numeral 10 generally designates a bottom outlet cyclone steam separator having a cylindrical separator vessel 12 in which separation of steam from water is effected. Vessel 12 is oriented vertically and is constructed of steel or any other suitable material. A dome shaped cover 14 is secured on vessel 12 to cover the top thereof by welding or in another suitable manner. A similarly shaped base 16 covers the bottom end of vessel 12 and is welded or otherwise secured thereto.

A baffle 18 is welded or otherwise secured within vessel 12 below the mid-point thereof to separate the interior of the vessel into a steam chamber 20 located above the baffle and a water chamber 22 located below baffle 18 in the lower portion of vessel 12. An inlet conduit 24 directs incoming fluid containing steam and water into vessel 12 at a location well above baffle 18 in the steam chamber 20. Inlet conduit 24 is preferably spiral shaped to direct the incoming fluid into vessel 12 in a curved path carrying the fluid along the cylindrical inside surface of the vessel. Alternatively, inlet conduit 24 can be a straight pipe which connects tangentially to the inside wall of vessel 12. Conduit 24 has a flange 26 on its outer end to facilitate connection with a flowline which delivers fluid to the steam separator from a geothermal well or from another source.

A vertical steam outlet conduit 28 has an open top end 30 located within steam chamber 20 well above inlet conduit 24. Conduit 28 extends concentrically within vessel 12 and through a round opening formed centrally in baffle 18. Conduit 28 is preferably welded to baffle 18 around the opening. The lower portion of conduit 28 extends through a short conduit 32 which is welded to the bottom of base 16. The bottom end of the short conduit 32 has a flange 34 which is welded or otherwise secured to another flange 36. The lower portion of conduit 28 extends through flange 36 and is welded thereto to separate the interior of conduit 28 from water chamber 22 and at the same time prevent leakage at the bottom of water chamber 22. The bottom end of steam outlet conduit 28 is welded at 38 to a curved elbow pipe 40 which is in turn secured to a short conduit 42 having a flange 44 for connection with a steam flowline. A water outlet 46 connects with the side of vessel 12 at a location near the bottom end of water chamber 22 to direct water out of the steam separator. Outlet 46 has a flange 48 on its outer end for connection with a line which directs water away from the steam separator 10. The steam may discharge directly from the top of the vessel as occurs in a top outlet separator.

Figure 2:
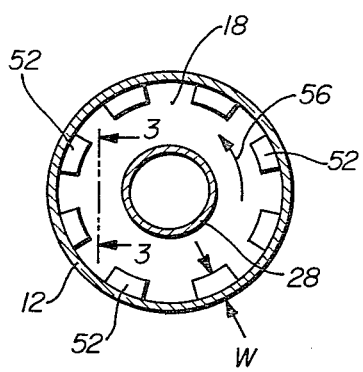
FIG. 2 is a sectional view taken generally along line 2—2 of FIG. 1 in the direction of the arrows.
Figure 3:
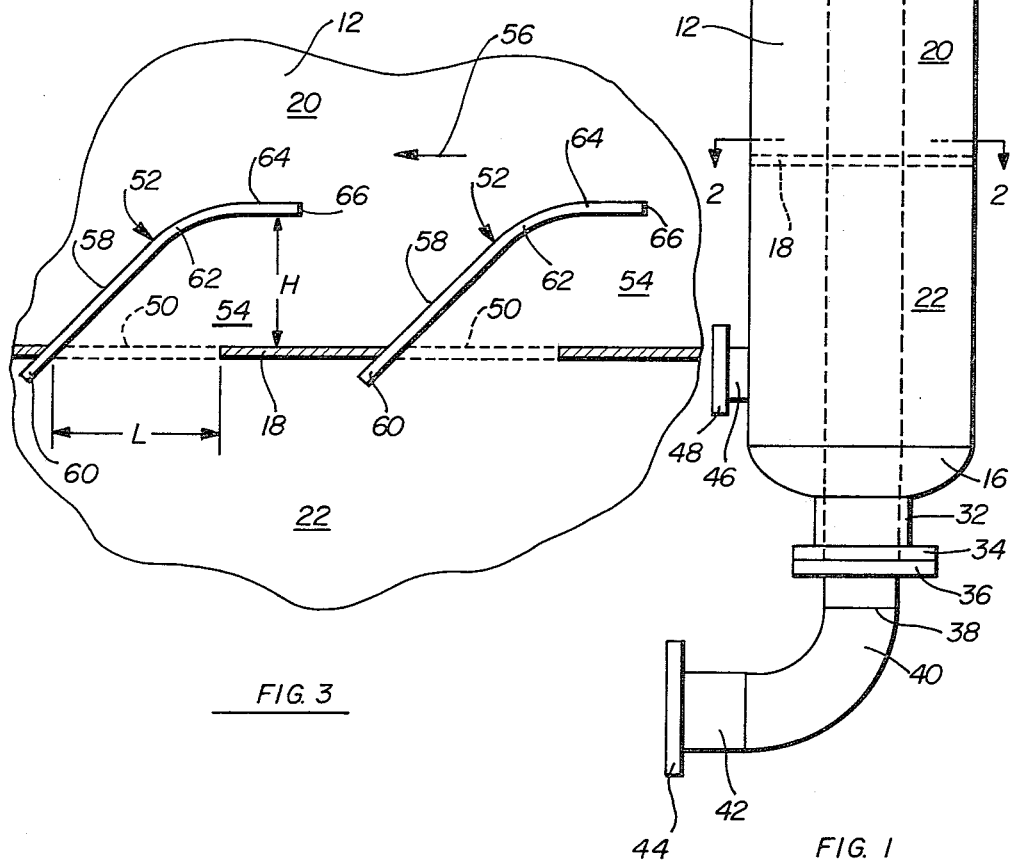
FIG. 3 is a fragmentary sectional view on an enlarged scale taken generally along line 3—3 of FIG. 2 in the direction of the arrows.

In accordance with the present invention, baffle 18 is a circular plate member which forms a horizontal partition separating steam chamber 20 from water chamber 22. Preferably, baffle 18 is located well below the center of vessel 12 and is welded to the cylindrical inside surface of vessel 12. With particular reference now to FIGS. 2 and 3, baffle 18 has a plurality of openings 50 (see FIG. 3) spaced equidistantly around its peripheral edge. Each opening 50 is located adjacent the wall of separator vessel 12 and is large enough to permit water to flow downwardly through baffle 18 from steam chamber 20 to water chamber 22. Openings 50 preferably have a generally rectangular configuration, although they may be formed in any desirable shape. In a preferred form of the invention, each opening 50 has a length dimension "L" (FIG. 3) of between about 6 inches and about 8 inches and a width dimension generally radially of baffle 18 in the range of about 6 inches to about 8 inches for a separator vessel of about 36 inches in diameter.

Each opening 50 has an associated scoop 52 projecting over it which serves to direct water through the opening into water chamber 22. As shown in FIG. 3, each scoop 52 has an open end 54 which faces in opposition to the direction of motion of the swirling fluid in vessel 12, such direction of motion being indicated by arrows 56 in FIGS. 2 and 3. A lower leg portion 58 of each scoop 52 connects near its bottom end with baffle 18 at the end of the corresponding opening 50 opposite the open end 54 of the scoop. A small lip portion 60 of each scoop projects slightly below baffle 18 from the bottom end of leg portion 58. Portion 58 of each scoop 52 inclines toward open end 54 from bottom to top at an angle of between about 30° and about 60° relative to baffle 18. A curved connecting portion 62 of each scoop joins leg portion 58 with a horizontal portion 64 which is parallel to and spaced above baffle 18. Each horizontal portion 64 extends well beyond the end of the corresponding opening 50 and terminates in a straight edge 66 which defines the top of open end 54 of the scoop. Each scoop 52 is open on the inside thereof which is the side facing toward the center of baffle 18. Scoops 52 are each adjacent to the inside surface of the cylindrical wall of vessel 12.

In a typical 36 inch diameter steam separator, it has been found that a particularly good separation effect is achieved when the dimension "H" (FIG. 3), which is the height of each scoop 52 between baffle 18 and portion 64, is between about six (6) inches and about eight (8) inches. The horizontal portion 64 of each scoop should extend beyond the end of the corresponding opening 50 a distance of at least about three (3) inches and preferably no more than about four (4) inches in order to effectively direct water into the scoop toward opening 50. The width dimension "W" (FIG. 2) of each scoop 52 in a direction radially of baffle 18 should be in the range of about six (6) inches to about eight (8) inches. With the dimensions in the ranges indicated, particularly effective separation of steam from water has been achieved in a steam separator 36 inches in diameter; these dimensions are thus preferred in ordinary situations, although other dimensions can be used under many circumstances and with varying sizes of separator vessels without adversely affecting the separator performance to a significant extent.

In use, a mixture of steam and water from a geothermal well or another source is directed into vessel 12 through inlet conduit 24. The spiral or tangential orientation of the inlet conduit 24 with respect to the inside surface of vessel 12 causes the incoming fluid to move in a swirling path within the separator vessel. The centrifugal force resulting from such swirling motion causes the water droplets to impact against the vessel wall and, in cooperation with gravitational forces, causes the water to drain downwardly within steam chamber 20 toward baffle 18. Salt and foreign materials also impinge against the vessel wall and move toward baffle 18 along with the water. The lighter steam is less effected by the centrifugal force and rises within steam chamber 20 where it enters the open top end 30 of steam outlet conduit 28 and flows out of the separator vessel for use in generating power or for another purpose.

The water which drains downwardly toward baffle 18 tends to swirl due to the cyclone action of the steam separator 10. Since the open ends 54 of scoops 52 face in opposition to the direction of motion of the swirling fluid, the water near baffle 18 is swept into scoops 52 through the open ends 54 and is directed by the scoops downwardly through openings 50 and into the water collection chamber 22. In addition, the centrifugal forces exerted on the water due to the swirling fluid tends to move the water outwardly and into scoops 52 through the open inside portions of the scoops. The salt and foreign matter passes into chamber 22 with the water. The water and other material which collects in chamber 22 is discharged from vessel 12 through the water outlet 46.

It is pointed out that the horizontal portions 64 of scoops 52 prevent fluid from passing straight downwardly into openings 50. Accordingly, only fluid which is adjacent the upper surface of baffle 18 is able to enter scoops 52, and this fluid is substantially all water since the lighter steam tends to rise rather than to fall toward baffle 18. The overhang of scoop portions 64 relative to the openings 50 is important in this respect in that it prevents downward passage of fluid toward openings 50 while permitting fluid to move toward the openings in a horizontal path. Consequently, the shape of scoops 52 makes them particularly effective in permitting water to drain through openings 50 while preventing steam from reaching openings 50 for passage below baffle 18 into water chamber 22. The considerable distance between baffle 18 and inlet 24 provides enough space to assure that the steam is not able to approach baffle 18 and possibly pass downwardly through openings 50 before it has had an opportunity to rise in steam chamber 20.

Since the water enters scoops 52 for the most part through their open ends 54, the combined area of the open ends of all of the scoops should be greater than the area of inlet 24 to the steam separator. Otherwise, water could enter vessel 12 at a greater rate than it is allowed to pass below baffle 18, and a water buildup above baffle 18 could result from the flow restriction. Consequently, the total area presented by open ends 54 between each edge 66 and baffle 18 and between the wall of vessel 12 and the inside of scoop 52 should be greater than the area of inlet 24 in order to avoid such a flow restriction.

What is claimed is:

1. In a cyclone type steam separator having a separator vessel presenting a substantially cylindrical inside surface, an inlet for directing incoming fluid containing a mixture of steam and water into the vessel in a manner to effect swirling motion of the fluid around said surface, a water chamber in the lower portion of the vessel for receiving water which impacts against said surface and drains downwardly, a water outlet for discharging water from said water chamber, a steam chamber in the upper portion of the vessel for receiving steam which rises above the water, and a vertical steam outlet conduit extending from the lower portion of the vessel into the steam chamber and having a steam inlet at its upper end for discharging steam from the steam chamber, the improvement comprising:

a generally horizontal baffle plate mounted in the separator vessel at a location to form a partition which separates the water and steam chambers from one another, said baffle plate having a central opening receiving the steam outlet conduit and being located below the inlet such that incoming fluid is directed into the steam chamber;

a plurality of openings arcuately spaced about the outer portion of said baffle plate and being of sufficient size to pass the swirling fluid downwardly through the baffle plate into the water chamber; and a plurality of scoop elements on said baffle plate associated with the respective openings, said scoop elements projecting above the baffle plate over the respective openings with an open end of each scoop element facing substantially in opposition to the direction of motion of the swirling fluid to thereby receive and direct the swirling fluid through the corresponding opening into the water chamber, each of said scoop elements having an upper portion extending generally upwardly from said baffle plate at one end of the corresponding opening, each upper portion inclining toward the open end of the corresponding scoop element from the bottom to top, said upper portion terminating at an edge defining the top of said open end of the scoop element, said edge being located laterally beyond the associated opening of the baffle plate.

2. The improvement set forth in claim 1, wherein each scoop element is open on it inner side.

3. The improvement set forth in claim 1, wherein the open ends of said scoop elements present a combined area greater than the area of the inlet to the separator vessel.

4. In a cyclone type steam separator having a separator vessel presenting a substantially cylindrical inside surface, an inlet for directing income fluid containing a mixture of steam and water into the vessel in a manner to effect swirling motion of the fluid around said surface, a water chamber in the lower portion of the vessel for receiving water which impacts against said surface and drains downwardly, a water outlet for discharging water from said water chamber, a steam chamber in the upper portion of the vessel for receiving steam which rises above the water, and a vertical steam outlet conduit extending from the lower portion of the vessel into the steam chamber and having a steam inlet at its upper end for discharging steam from the steam chamber, the improvement comprising:

a generally horizontal baffle plate mounted in the separator vessel at a location to form a partition which separates the water and steam chambers from one another, said baffle plate having a central opening receiving the steam outlet conduit and being located below the inlet such that incoming fluid is directed into the steam chamber;

a plurality of openings arcuately spaced about the outer portion of said baffle plate and being of sufficient size to pass the swirling fluid downwardly through the baffle plate into the water chamber; and a plurality of scoop elements on said baffle plate associated with the respective openings, said scoop elements projecting above the baffle plate over the respective openings with an open end of each scoop element facing substantially in opposition to the direction of motion of the swirling fluid to thereby receive and direct the swirling fluid through the corresponding opening into the water chamber, each of said scoop elements having a lower portion extending below said baffle plate for directing the swirling fluid downwardly.

5. In a cyclone type steam separator having a separator vessel presenting a substantially cylindrical inside surface, an inlet for directing incoming fluid containing a mixture of steam and water into the vessel in a manner to effect swirling motion of the fluid around said surface, a water chamber in the lower portion of the vessel for receiving water which impacts against said surface and drains downwardly, a water outlet for discharging water from said water chamber, a steam chamber in the upper portion of the vessel for receiving steam which rises above the water, and a vertical steam outlet conduit extending from the lower portion of the vessel into the steam chamber and having a steam inlet at its upper end for discharging steam from the steam chamber, the improvement comprising:

a generally horizontal baffle plate mounted in the separator vessel at a location to form a partition which separates the water and steam chambers from one another, said baffle plate having a central opening receiving the steam outlet conduit and being located below the inlet such that incoming fluid is directed into the steam chamber;

a plurality of openings arcuately spaced about the outer portion of said baffle plate and being of sufficient size to pass the swirling fluid downwardly through the baffle plate into the water chamber; and a plurality of scoop elements on said baffle plate associated with the respective openings, said scoop elements projecting above the baffle plate over the respective openings with an open end of each scoop element facing substantially in opposition to the direction of motion of the swirling fluid to thereby receive and direct the swirling fluid through the corresponding opening into the water chamber, each of said scoop elements having an upper portion extending generally upwardly from said baffle plate at one end of the corresponding opening, each upper portion inclining toward the open end of the corresponding scoop element from the bottom to top, said upper portion terminating at an edge defining the top of said open end of the scoop element, said edge being located laterally beyond the associated opening of the baffle plate, each of said scoop elements having a lower portion extending below said baffle plate for directing the swirling fluid downwardly.

* * * * *